US008882486B2

(12) United States Patent
Ueda et al.

(10) Patent No.: US 8,882,486 B2
(45) Date of Patent: Nov. 11, 2014

(54) CONTROL DEVICE FOR AN INJECTION MOLDING MACHINE

(75) Inventors: Koichiro Ueda, Chiyoda-ku (JP);
Kiyoshi Hasegawa, Chiyoda-ku (JP);
Hidemasa Ogi, Chiyoda-ku (JP);
Yukihiko Kobayashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 310 days.

(21) Appl. No.: 13/496,446

(22) PCT Filed: Aug. 1, 2011

(86) PCT No.: PCT/JP2011/067619
§ 371 (c)(1),
(2), (4) Date: Mar. 15, 2012

(87) PCT Pub. No.: WO2013/018189
PCT Pub. Date: Feb. 7, 2013

(65) Prior Publication Data
US 2013/0032961 A1    Feb. 7, 2013

(51) Int. Cl.
*B29C 45/77*    (2006.01)
*B29C 45/76*    (2006.01)

(52) U.S. Cl.
CPC ....... *B29C 45/76* (2013.01); *B29C 2945/76859* (2013.01); *B29C 2945/76257* (2013.01); *B29C 2945/76006* (2013.01); *B29C 2945/76598* (2013.01); *B29C 2945/76933* (2013.01); *B29C 2945/76381* (2013.01); *B29C 45/77* (2013.01)
USPC ........... 425/145; 264/40.7; 425/149; 425/150

(58) Field of Classification Search
CPC ...... B29C 45/5008; B29C 45/77; B29C 45/66
USPC .......... 425/145, 149, 150; 264/40.7
See application file for complete search history.

(56) References Cited

U.S. PATENT DOCUMENTS

| 5,869,108 | A  | * | 2/1999  | Hiraoka ................. 425/145 |
| 6,811,387 | B1 |   | 11/2004 | Tsutsumi et al. |
| 8,119,044 | B1 | * | 2/2012  | Akasaka ................ 264/40.7 |
| 2001/0020753 | A1 | * | 9/2001 | Sato et al. ............ 264/40.5 |
| 2011/0175248 | A1 | * | 7/2011 | Akasaka ................ 264/40.7 |

FOREIGN PATENT DOCUMENTS

| JP | 4-175135 A | 6/1992 |
| JP | 6-55598 A | 3/1994 |
| JP | 2000-202875 A | 7/2000 |

(Continued)

*Primary Examiner* — Tim Heitbrink
(74) *Attorney, Agent, or Firm* — Sughrue Mion, PLLC; Richard C. Turner

(57) ABSTRACT

To execute a stable pressure control, in a control device for an injection molding machine, a filling/pressure-keeping determining unit determines whether the injection molding machine is performing a pressure keeping operation, an elastic constant identifier acquires, when the filling/pressure-keeping determining unit determines that the pressure keeping operation is in progress, a pressure detection value and a position detection value as operation information of a motor and identifies an elastic constant K based on the acquired pressure detection value and the position detection value, and a pressure-control control-parameter setting unit calculates a proportional gain Ka of a pressure controller such that a product of the proportional gain Ka of the pressure controller and the elastic constant K is smaller than a speed control bandwidth $\omega sc$ of a speed controller, and sets the calculated proportional gain Ka to the pressure controller.

11 Claims, 8 Drawing Sheets

(56) References Cited

FOREIGN PATENT DOCUMENTS

| | | |
|---|---|---|
| JP | 2006-326614 A | 12/2006 |
| JP | 2008-73713 A | 4/2008 |
| JP | 2010-111009 A | 5/2010 |
| JP | 4674923 B1 | 2/2011 |

\* cited by examiner

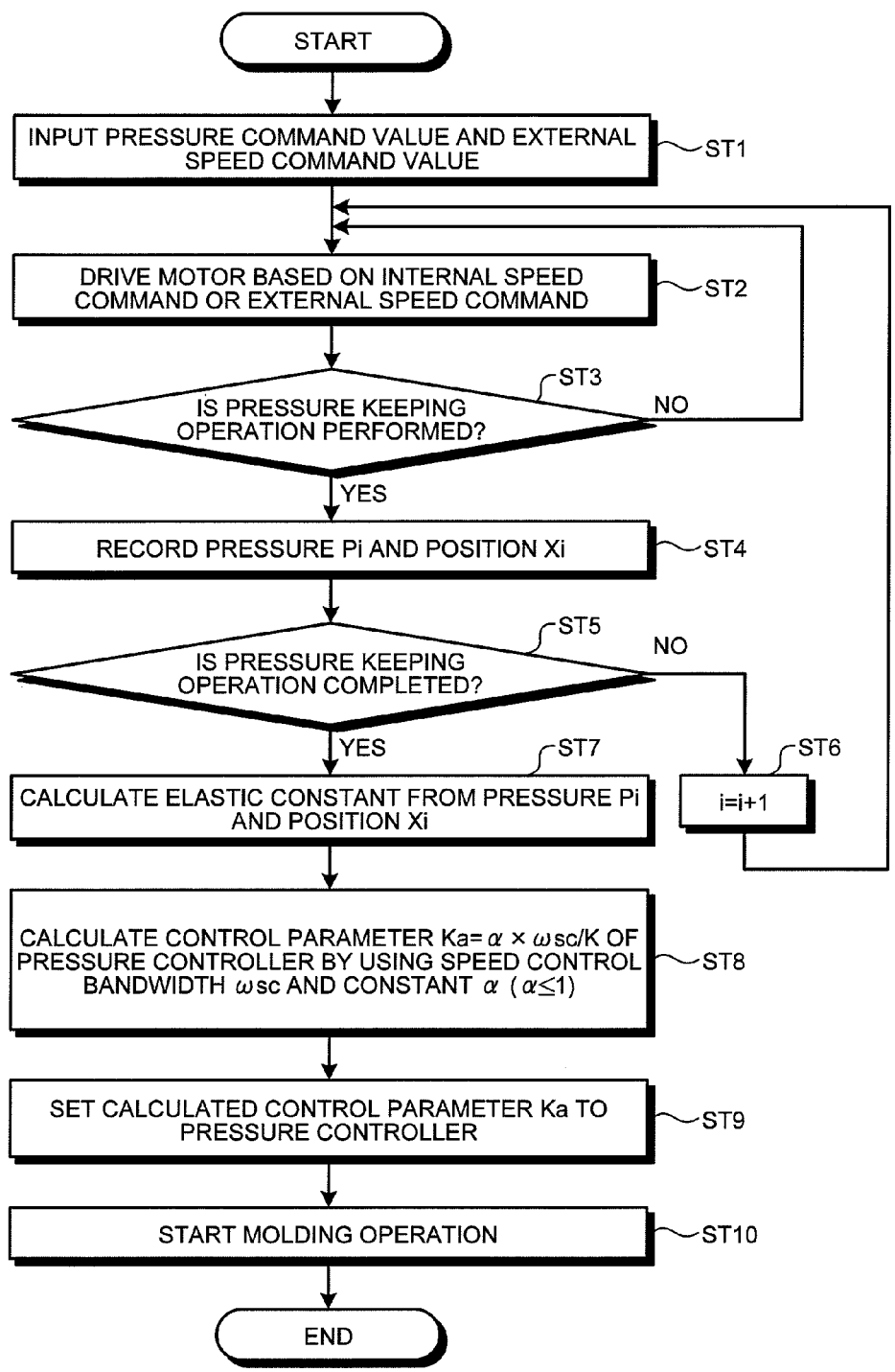

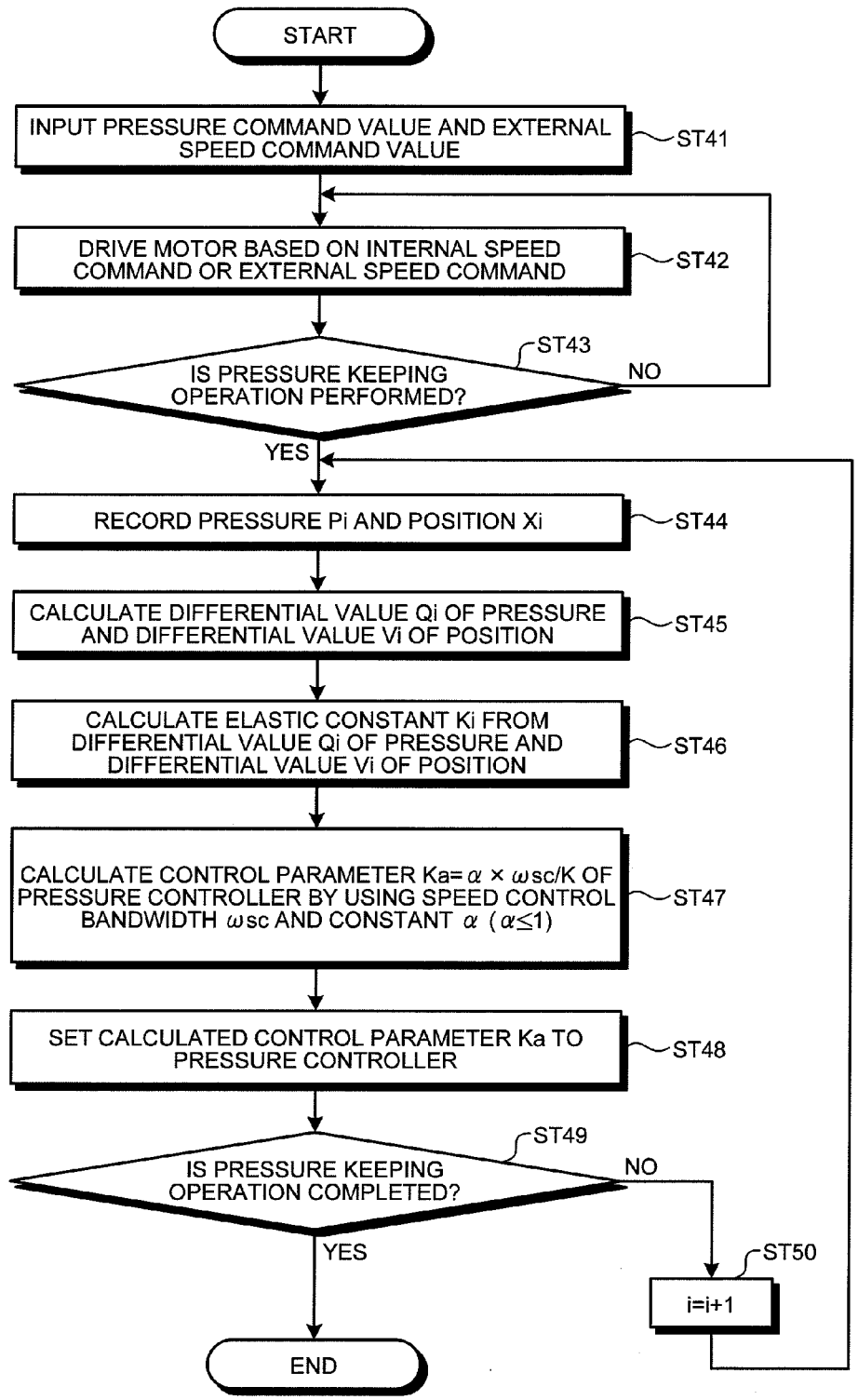

1

CONTROL DEVICE FOR AN INJECTION MOLDING MACHINE

CROSS REFERENCE TO RELATED APPLICATIONS

This application is a National Stage of International Application No. PCT/JP2011/067619 filed on Aug. 1, 2011, the contents of all of which are incorporated herein by reference in their entirety.

FIELD

The present invention relates to a control device and a control method for controlling an injection molding machine.

BACKGROUND

There is conventionally known a type of injection molding machine that obtains a plastic molding product by driving a screw with a motor, filling a melted resin by operations of the screw in a mold, and keeping a pressure of the resin. This conventional injection molding machine is equipped with a pressure sensor such as a load cell on the screw, and performs a pressure control on the resin such that the pressure of the resin follows a pressure command value that is externally given based on a control loop using a pressure detection value output from the pressure sensor.

In the pressure control described above, it is necessary to set a control parameter such as a gain to an appropriate value. Particularly in a pressure keeping operation, if the control parameter is larger than the appropriate value, it causes a problem that a pressure response (a time response waveform) becomes overshot with respect to a target pressure command or the pressure response exhibits an oscillating behavior.

When the pressure response shows an overshoot or an oscillation in the pressure keeping operation, a pressure larger than an intended pressure is applied. As a result, the dimension of the molded product may become too large or a flash or a mold release failure may occur. Furthermore, in the worst case, an oscillation occurs in a continuous manner in the pressure response, and this can cause a control system to be unstable.

In order to prevent the overshoot or the oscillation from occurring in the pressure response and to ensure a following characteristic to the pressure command value to a certain extent, it is necessary to manually adjust the control parameter for the pressure control by trial and error while checking the pressure response, which causes a problem that the time required for the adjustment increases.

In addition, there is another problem that an appropriate control parameter depends on the shape of the mold or the type of the resin, so that the appropriate control parameter needs to be adjusted for each shape of the mold and each type of the resin.

To deal with these problems, a control device for an injection molding machine is disclosed in Patent Literature 1, which differentiates an operational pattern such as a pressure command value and determines a control parameter for a pressure control in a continuous manner with zero of the obtained differential value as a basis.

CITATION LIST

Patent Literature

Patent Literature 1: Japanese Patent Application Laid-open No. H06-55598

SUMMARY

Technical Problem

The pressure response is determined not only depending on a control parameter for a pressure control but also depending on a response of a minor loop (for example, a speed control loop) in a pressure control loop. Because the control device for an injection molding machine disclosed in Patent Literature 1 does not adjust the control parameter for the pressure control in consideration of considering the control parameter of the minor loop in the pressure control loop, there is a possibility that the pressure response still exhibits an oscillating behavior.

The present invention has been achieved in view of the above problems, and an object of the present invention is to obtain a control device for controlling an injection molding machine and a control method thereof, with which it is possible to execute a stable pressure control.

Solution to Problem

In order to solve the aforementioned problems, a control device for an injecting molding machine that injects a melted resin filled in a barrel into a cavity of a mold by driving a motor to move forward a screw in the barrel, wherein the control device, which is provided in the injection molding machine, generates a current command for driving the motor based on operation information of the motor and a pressure detection value of the melted resin according to one aspect of the present invention is constructed in such a manner as to include: a pressure controller that calculates a speed command by performing a transfer characteristic computation including a computation element that applies at least a proportional gain on a deviation between a predetermined pressure command and the pressure detection value; a speed controller that calculates the current command such that a speed of the motor follows a speed command calculated by the pressure controller; a pressure-keeping-operation determining unit that determines whether the injection molding machine is performing a pressure keeping operation; an elastic constant identifier that acquires, when the pressure-keeping-operation determining unit determines that the pressure keeping operation is in progress, the pressure detection value and the operation information of the motor and identifies an elastic constant that is a proportion of a change of the pressure detection value with respect to a displacement of a position of the motor based on the acquired pressure detection value and the operation information of the motor; and a control-parameter setting unit that calculates the proportional gain of the pressure controller such that a product of the proportional gain of the pressure controller and the elastic constant identified by the elastic constant identifier is smaller than a speed control bandwidth of the speed controller, and sets the calculated proportional gain to the pressure controller.

Advantageous Effects of Invention

Because the control device for an injection molding machine according to the present invention obtains a proportional gain of a pressure control based on an elastic constant at the time of a pressure keeping operation and a speed control bandwidth of a speed control loop included in a pressure control loop, the speed of a motor can follow a speed command with a sufficient accuracy at the time of the pressure keeping operation, and therefore it is possible to perform a stable pressure control.

BRIEF DESCRIPTION OF DRAWINGS

FIG. 2 is a flowchart for explaining a control method for the injection molding machine according to the first embodiment.

FIG. 3-1 is an explanatory diagram of a pressure keeping operation.

FIG. 3-2 is an explanatory diagram of a filling operation.

FIG. 8 is a flowchart for explaining a control method for the injection molding machine according to the third embodiment.

DESCRIPTION OF EMBODIMENTS

Exemplary embodiments of a control device and a control method for an injection molding machine according to the present invention will be explained below in detail with reference to the accompanying drawings. The present invention is not limited to the embodiments.

First Embodiment

Figure 1:
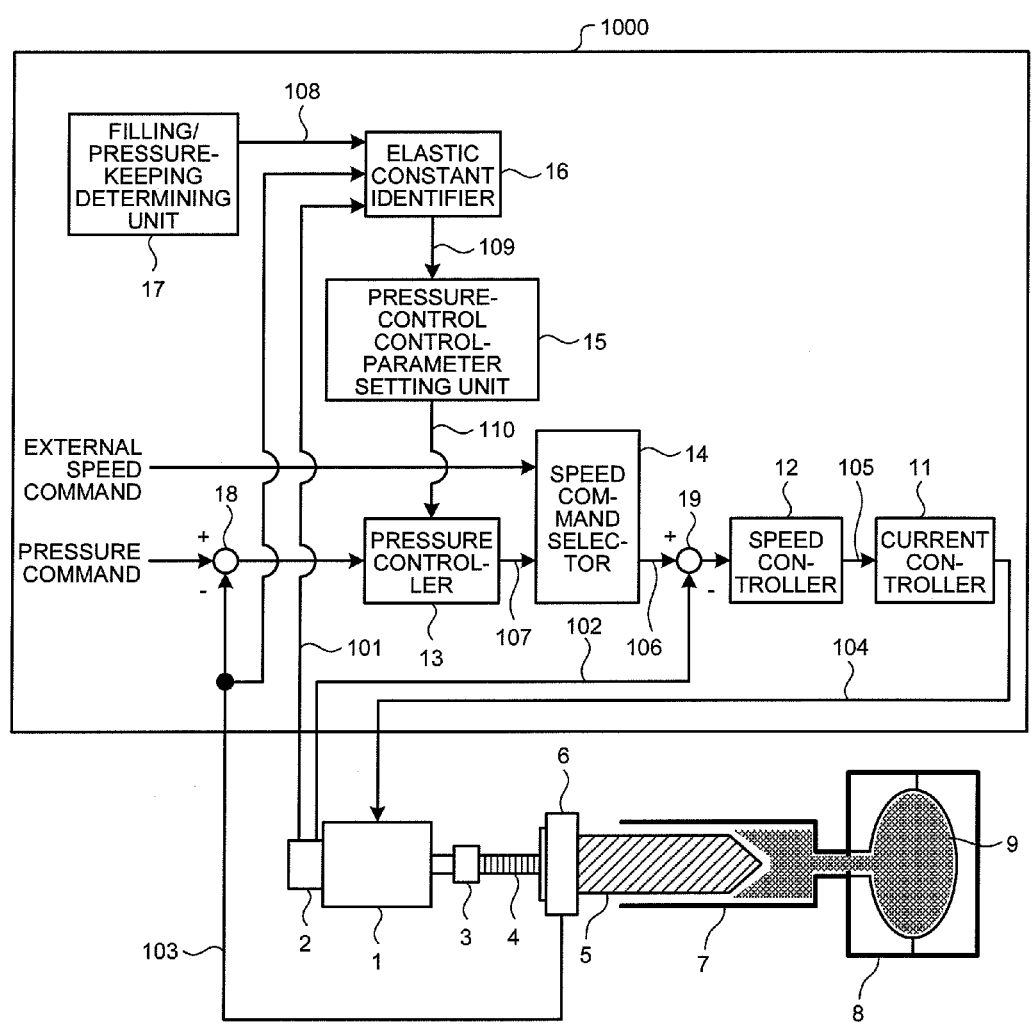
FIG. 1 depicts a configuration of an injection molding machine including a control device according to a first embodiment of the present invention.

FIG. 1 depicts a configuration of an injection molding machine including a control device according to a first embodiment of the present invention. As shown in FIG. 1, the injection molding machine includes a control device 1000, a motor 1, an encoder 2, a coupling 3, a ball screw 4, a screw 5, a load cell 6, a barrel 7, and a mold 8.

The motor 1 is driven by a current supplied from the control device 1000. The encoder 2 detects the position and speed of the motor 1 and outputs detection results as a position detection value 101 and a speed detection value 102. The coupling 3 connects a rotation shaft of the motor 1 and the ball screw 4. The screw 5 for filling a resin 9 that is filled in the barrel 7 into the mold 8 and keeping a pressure of the resin 9 is connected to the ball screw 4 via the load cell 6. The load cell 6 detects a pressure at the time when the screw 5 extrudes the resin 9 and outputs a detection result as a pressure detection value 103. The position detection value 101, the speed detection value 102, and the pressure detection value 103 are input to the control device 1000.

The control device 1000 includes a current controller 11, a speed controller 12, a pressure controller 13, a speed command selector 14, a pressure-control control-parameter setting unit 15, an elastic constant identifier 16, a filling/pressure-keeping determining unit 17, a subtractor 18, and a subtractor 19.

The subtractor 18 calculates a deviation between a pressure command that is externally input and the pressure detection value 103. The pressure controller 13 calculates an internal speed command 107 by using the deviation calculated by the subtractor 18.

A transfer characteristic computation performed by the pressure controller 13 can be any type of computation as long as it includes a computation element that exerts a proportional gain on the deviation calculated by the subtractor 18. For example, the pressure controller 13 can be configured with a P control (a proportional control). In that case, the pressure controller 13 calculates the internal speed command 107 by multiplying the input deviation by the proportional gain. That is, the internal speed command 107 decreases as the deviation decreases.

The speed command selector 14 selects either one of the speed command that is externally input (an external speed command) and the internal speed command 107 calculated by the pressure controller 13 and outputs a selected speed command as a speed command 106.

The speed command selector 14 can be configured to compare the external speed command with the internal speed command 107 in a sequential manner and select a smaller value. An operator of the injection molding machine can input a screw speed at a desired filling process as the external speed command. Alternatively, a position control loop can be incorporated to control the speed of the screw 5 so as to use a speed command output from the position control loop as the external speed command.

The subtractor 19 calculates a deviation between the speed command 106 and the speed detection value 102.

The speed controller 12 generates a current command 105 to input to the current controller 11 by using the deviation calculated by the subtractor 19 such that the speed of the screw 5 follows the speed command 106. The current controller 11 generates a current 104 to be supplied to the motor 1 based on the current command 105 input from the speed controller 12.

The speed controller 12 can be configured to generate the current command 105 by performing a computation according to, for example, a PI control (proportional+integral control) with respect to the deviation between the speed command 106 and the speed detection value 102.

A control on a filling operation and a control on a pressure keeping operation performed by the control device 1000 are explained below. The external speed command and the pressure command are considered to be given by the operator in advance.

Before the filling operation starts, because the extrusion of the resin 9 into the mold 8 is not performed, the pressure detection value 103 indicates a value near zero. For this reason, the deviation between the pressure command and the pressure detection value 103 is large, and the internal speed command 107 output from the pressure controller 13 based on the deviation is a signal larger than the external speed command. Therefore, the speed command selector 14 selects the external speed command as the speed command 106. When the control device 1000 starts the filling operation while performing a speed control based on the external speed command, the pressure detection value 103 increases gradually as the screw 5 moves forward.

If the pressure detection value 103 approaches a target pressure (that is, a pressure command), the deviation between the pressure command and the pressure detection value 103 decreases, and the internal speed command 107 also decreases in accordance with a decrease of the deviation. When the internal speed command 107 becomes smaller than the external speed command, the speed command selector 14 outputs the internal speed command 107 as the speed command 106.

From the above processes, right after a start of a molding operation, the filling operation is performed by driving the screw 5 with the external speed command, and with a progression of the filling operation, the resin 9 is filled in the mold 8, which is accompanied by an increase of the pressure. When the pressure approaches the target pressure, the internal speed command 107 output from the pressure controller 13 is used, and a pressure is applied by a preset pressure command, by which the pressure keeping operation is executed. With this method, the filling operation and the pressure keeping operation of the injection molding machine are achieved.

Referring back to FIG. 1, the filling/pressure-keeping determining unit 17 determines whether the injection molding machine is performing the filling operation or the pressure keeping operation and outputs a determination result to the elastic constant identifier 16 as a signal 108.

When the filling/pressure-keeping determining unit 17 determines that the pressure keeping operation is in progress, the elastic constant identifier 16 acquires the position detection value 101 of the motor and the pressure detection value 103 and identifies an elastic constant K that is a proportion of a change of the pressure detection value 103 with respect to a displacement of a position of the motor 1 based on the acquired position detection value 101 and the pressure detection value 103. The elastic constant identifier 16 then inputs the identified elastic constant K to the pressure-control control-parameter setting unit 15 as a signal 109.

The pressure-control control-parameter setting unit 15 calculates the control parameter of the pressure controller 13 by using the identified elastic constant K, and sets the calculated control parameter to the pressure controller 13 (a signal 110). Here, the control parameter set by the pressure controller 13 is considered to be a proportional gain.

Figures 1, 3:
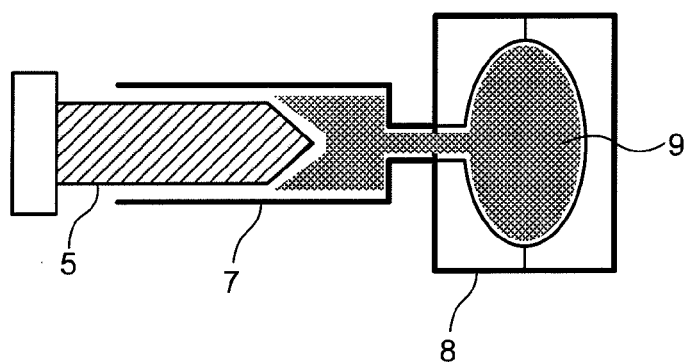
Figures 2, 3:
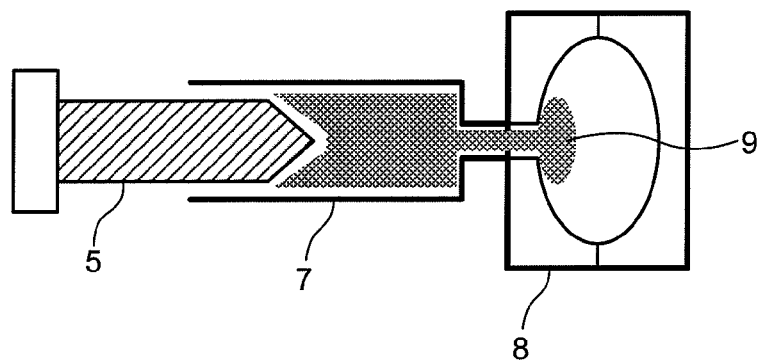

FIG. 2 is a flowchart for explaining a control method of the injection molding machine according to the first embodiment, which is implemented by using the control device 1000 described above. First, the control device 1000 receives inputs of a pressure command and an external speed command (Step ST1). It is assumed here that the values of the input pressure command and the external speed command are not zero.

The speed command selector 14 compares the internal speed command 107 calculated by the pressure controller 13 based on the pressure command with the input external speed command, selects a command having a smaller absolute value as the speed command 106, and the control device 1000 drives the motor based on the selected speed command 106 (Step ST2). The pressure-control control-parameter setting unit 15 outputs a proportional gain having a value small enough to prevent an oscillation of the pressure or the speed as the signal 110 in advance as an initial value, and sets the proportional gain to the pressure controller 13.

Subsequently, the filling/pressure-keeping determining unit 17 determines whether the pressure keeping operation is in progress (Step ST3). A specific method for implementing the determination at Step ST3 includes, for example, determining that the pressure keeping operation is in progress when the position detection value 101 of the motor 1 is equal to or larger than a predetermined position and determining that the pressure keeping operation is not in progress when the position detection value 101 is smaller than the predetermined position. This is based on the fact that it is possible to determine whether the pressure keeping operation is in progress, if the volume of a cavity of the mold 8 is known in advance, by figuring out the amount of moving forward of the screw 5 that causes the resin 9 to be filled in the cavity of the mold 8 (in other words, the amount of rotation of the motor 1 that causes the resin 9 to be filled in the cavity). Another method for implementing the determination is to determine that the pressure operation is in progress when the pressure detection value 103 is equal to or larger than a predetermined pressure and to determine that the pressure keeping operation is not in progress when the pressure detection value 103 is smaller than the predetermined pressure. However, the method for determining whether the pressure keeping operation is in progress is not limited to the above examples, and can be any other method.

When the pressure keeping operation is not in progress (NO at Step ST3), the control device 1000 performs the process of Step ST2.

When the pressure keeping operation is in progress (YES at Step ST3), the filling/pressure-keeping determining unit 17 notifies the signal 108 indicating that the pressure keeping operation is in progress to the elastic constant identifier 16, and the elastic constant identifier 16 that received the notification loads a value of the pressure detection value 103 and a value of the position detection value 101 at the same timing and respectively records the loaded value of the pressure detection value 103 and the loaded value of the position detection value 101 (Step ST4). The values recorded at the process of Step ST4 are represented by a pressure Pi (i=1, 2, ..., N) and a position Xi (i=1, 2, ..., N), respectively. Processes from Step ST2 to Step ST6 (described later) constitute a loop process. The loop process is performed for every predetermined sampling time, and the index i is incremented by the process of Step ST6 (described later) every time Step ST4 is performed.

Thereafter, the filling/pressure-keeping determining unit 17 determines whether the pressure keeping operation is completed (Step ST5). A specific method for implementing the determination at Step ST5 includes, for example, counting time with a timer or the like since the pressure keeping operation starts, and when the time set in advance by an operator of the injection molding machine elapses, determining that the pressure keeping operation is completed. However, the method for the determining process at Step ST5 is not limited to this method.

When the pressure keeping operation is not completed (NO at Step ST5), the filling/pressure-keeping determining unit 17 increments the index i (Step ST6). The control device 1000 then performs the process of Step ST2.

When the pressure keeping operation is completed (YES at Step ST5), the elastic constant identifier 16 identifies the elastic constant K by applying time series data of the pressure Pi and the position Xi that have been recorded into the following Equation (1) that represents a linear relation between the pressure and the position (Step ST7):

$$Pi = K \cdot Xi + b \qquad (1),$$

where b is a constant. Specifically, the elastic constant identifier 16 configures vectors P, X, and B from the recorded data as follows:

$$P = (P1, P2, \ldots, PN) \qquad (2)$$

$$X = (X1, X2, \ldots, XN) \qquad (3)$$

$$B = (1, 1, \ldots, 1) \qquad (4)$$

The elastic constant identifier 16 then substitutes the Equations (2) to (4) for the Equation (1) to obtain:

$$P = K \cdot X + b \cdot B \qquad (5)$$

Finally, the elastic constant identifier 16 identifies K and b that satisfy the Equation (5) by using the least squares method or the like.

That is, the elastic constant identifier 16 performs acquisition of the position detection value 101 of the motor 1 and the pressure detection value 103 at the same timing over a plurality of times and identifies the elastic constant by using the position detection value 101 of the motor 1 and the pressure detection value 103 acquired over a plurality of times. In order to identify the elastic constant, the elastic constant identifier 16 performs fitting of a plurality of the acquired position detection values 101 and a plurality of the acquired pressure detection values 103 to a proportional relation by using the least squares method. However, the fitting method is not limited to the least squares method.

The elastic constant identifier 16 then outputs the identified elastic constant K to the pressure-control control-parameter setting unit 15 as the signal 109.

The pressure-control control-parameter setting unit 15 calculates the proportional gain as the control parameter of the pressure controller 13 by using the elastic constant K input as the signal 109, a speed control bandwidth ωsc, and a constant α (α≤1) (Step ST8), and sets the calculated proportional gain to the pressure controller 13 (Step ST9).

The speed control bandwidth indicates an upper limit of a frequency bandwidth for which the speed can follow the speed command without any delay when the speed controller is used. A specific method for obtaining the speed control bandwidth ωsc includes, for example, applying a sine wave signal as the speed command in advance using an FFT analyzer or the like and measuring an upper limit of a frequency with which the speed can follow the speed command without causing any phase delay.

The speed control bandwidth ωsc can also be obtained in a simple manner by using a relational expression:

$$\omega sc = Kv/J \quad (6),$$

where Kv is proportional transfer characteristic of the speed controller 12 and J is total inertia of a machine that moves with a rotation of the motor 1 and the motor 1. When the speed controller 12 is configured with the PI control, that is, when a transfer characteristic V(s) of the speed controller 12 is defined by:

$$V(s) = Kv \cdot (1 + Kvi/s) \quad (7),$$

where Kv is proportional gain, s is Laplace operator, and Kvi is integral gain, the speed control bandwidth ωsc can be obtained by substituting the proportional gain Kv of the Equation (7) for the Equation (6).

The pressure-control control-parameter setting unit 15 calculates the proportional gain Ka of the pressure controller 13 by using the following Equation (8):

$$Ka = \alpha \times \omega sc/K \quad (8)$$

For example, when the pressure controller 13 is configured with the P control (the proportional control), that is, when the transfer characteristic F(s) of the pressure controller 13 is defined by:

$$F(s) = Ka \quad (9),$$

the pressure-control control-parameter setting unit 15 sets a value calculated by the Equation (8) to Ka of the Equation (9). Although the constant α can take any value as long as it is equal to or smaller than 1, it is more preferable that, for example, a be equal to or larger than 0.1 and equal to or smaller than 1 in order to ensure a certain degree of a pressure response.

On the other hand, when the pressure controller 13 is configured with a control law other than the proportional control, the pressure-control control-parameter setting unit 15 sets a value calculated by using the Equation (8) to the proportional gain included in the transfer characteristic of the pressure controller 13. Among the control parameters of the pressure controller 13, it is a proportional characteristic among the transfer characteristics of the pressure controller 13 that most affects the responsiveness and stability. By calculating the proportional gain that determines the proportional characteristic by using the Equation (8), it is possible to calculate the control parameter of the pressure controller 13 for achieving good responsiveness and stability. For example, even when the pressure controller 13 is configured with the PI control (proportional and integral control), that is, the transfer characteristic F(s) is defined by:

$$F(s) = Ka \cdot (1 + Kai/s) \quad (10),$$

where Kai is integral gain, the pressure-control control-parameter setting unit 15 sets a value calculated by using the Equation (8) to the proportional gain Ka of the Equation (10).

Furthermore, when the pressure controller 13 is configured with phase lead/lag compensation, that is, the transfer characteristic F(s) of the pressure controller 13 is defined by:

$$F(s) = Ka \times (1 + T1 \cdot s)/(1 + T2 \cdot s) \quad (11)$$

The Equation (11) can be modified to:

$$F(s) = Ka \times \{1 + (T2 - T1)s/(1 + T2 \cdot s)\} \quad (12)$$

The pressure-control control-parameter setting unit 15 sets a value calculated by using the Equation (8) to the proportional gain Ka of the Equation (12). T1 and T2 are set in advance as control parameters.

After performing the process of Step ST9, the control device 1000 starts a molding operation of an actual product by using the proportional gain set to the pressure controller 13 (Step ST10). Specifically, because the pressure keeping operation is completed when the control moved to Step ST9, the control device 1000 retracts the screw 5 and measures an amount of the resin 9, and performs the filling operation and the pressure keeping operation in a state where the control parameter is set to the pressure controller 13 by the process of Step ST9. After the molding process, all the operation pertaining to the control method for the injection molding machine according to the first embodiment is completed.

During the processes of Step ST1 to Step ST9, the pressure controller 13 is in a state where a so-called tentative proportional gain, which is given as an initial value, is set. There is a possibility that an overshoot or an oscillation can occur on the pressure response at this time. However, after starting the molding operation of a product at Step ST10, neither the overshoot nor the oscillation occurs on the pressure response, and it is possible to perform the pressure control in a state where the following capability with respect to the pressure command is ensured to a certain extent. This makes it possible to achieve a molding operation without causing any molding size failure or a molding failure such as a sink mark at Step ST10.

FIG. 3-1 is an explanatory diagram of a pressure keeping operation, and FIG. 3-2 is an explanatory diagram of a filling operation. As shown in FIG. 3-1, during the pressure keeping operation, the screw 5 applies a pressure to a product to be molded that is formed in the cavity of the mold 8. In the pressure keeping operation, because the resin 9 is filled in the mold 8, when a pressure is applied from the outside, the resin roughly exhibits an elastic body-like behavior according to a shape of the cavity of the mold 8 and a type of the resin 9. That is, the pressure is applied to the resin 9 by a forward movement of the screw 5 driven by the motor 1; however, because the resin 9 exhibits an elastic body-like behavior as described above, a magnitude of the pressure is generated being roughly proportional to a position with an elastic constant of the elastic body as a proportional constant.

On the other hand, as shown in FIG. 3-2, the filling operation is in a state where the resin 9 in the barrel 7 is injected by the screw 5 so that the resin is injected into the mold 8 from a tip of a nozzle. For this reason, even if the pressure is applied to the resin by a forward movement of the screw 5 driven by the motor 1, because the resin 9 is not filled in the cavity of the mold 8, the pressure is converted into a work to inject the resin into the mold 8 from the tip of the nozzle, and therefore the pressure proportional to the position of the motor 1 is not generated.

Although data of the pressure keeping operation is only used when identifying the elastic constant K in the flowchart of FIG. 2, if data of the filling operation is used together to identify the elastic constant, it is not possible to identify the elastic constant required to adjust the control parameter at the time of the pressure control in a correct manner even if the position and the pressure of the filling operation are used, because no proportional relation is established between the position and the pressure in the filling operation as described above.

Figure 4:
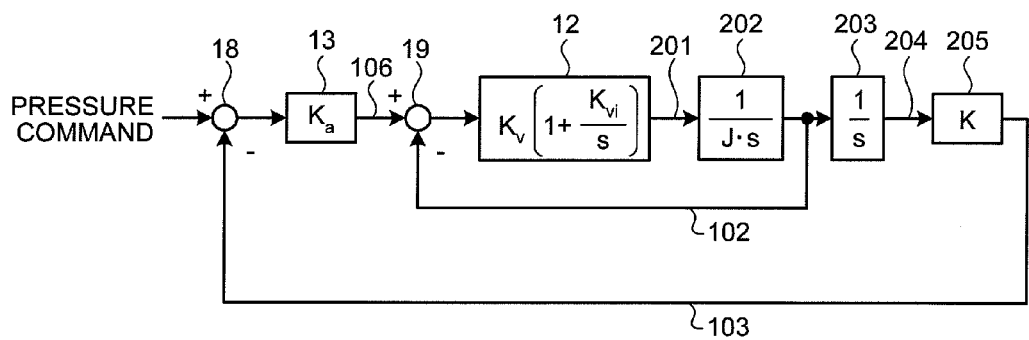
FIG. 4 is a block diagram for explaining a transfer characteristic of an injection molding machine when a speed command selector selects an internal speed command.

FIG. 4 is a block diagram for explaining a transfer characteristic of an injection molding machine when the speed command selector 14 selects the internal speed command 107. In this example, it is considered that the speed controller 12 is configured with the PI control taking the proportional gain as Kv and the integral gain as Kvi, and the pressure controller 13 is configured with the P control taking the proportional gain as Ka, where s indicates the Laplace operator and 1/s indicates the integral characteristic. J is a total inertia obtained by taking a sum of the inertia of the motor 1 and the inertia of the mechanical moving part (the ball screw 4, the screw 5, and the load cell 6), and K is the elastic constant identified by the elastic constant identifier 16.

A signal 201 indicates a torque generated in the motor 1 when the current 104 flows. Because a relation between the torque and the speed of the motor 1 can be represented as $1/(J \cdot s)$, the motor 1 is replaced by an element 202 having a transfer characteristic of $1/(J \cdot s)$. That is, the element 202 outputs the speed (the speed detection value 102) in response to the torque.

A signal 204 indicates the position of the motor 1. The position of the motor 1 is obtained by integrating the speed of the motor 1. An element 203 schematically represents a characteristic on the speed, and the speed (the speed detection value 102) is integrated to output the position.

As described above, in the pressure keeping operation, the position and the pressure have a proportional relation, and the proportional constant becomes the elastic constant K. An element 205 schematically represents a characteristic on the pressure of the resin 9 and outputs a signal (the pressure detection value 103) indicating the pressure from the signal 204 indicating the position.

As shown in FIG. 4, at the time of performing the pressure keeping operation, the configuration includes a speed control in the minor loop of the pressure control. In other words, the major loop of the speed control loop is the pressure control. In order to perform the pressure control, the pressure controller 13 calculates the speed command 106 with which the motor 1 is to be driven, based on a deviation between the pressure command value and the pressure detection value 103, and by the speed detection value 102 following the speed command, the pressure detection value 103 can follow the pressure command value. On the other hand, if the response of the speed with respect to the speed command 106 is slow so that the speed follows the speed command 106 with a large phase lag, the pressure control loop becomes incorporated with a large phase lag, and as a result, the pressure response exhibits an overshoot or an oscillating response.

The response of the pressure control is most affected by a proportional component (Ka in FIG. 4) among the control parameters of the pressure controller 13 constituting the major loop. Assuming that the transfer characteristic (the transfer characteristic from the speed command 106 to the speed detection value 102) of the speed control constituting the minor lop is 1, the transfer characteristic from the pressure command to the speed command 106 is $Ka \cdot s/(s+K \cdot Ka)$. A further modification of this transfer characteristic leads to $s/K \times \{Ka \cdot K/(s+K \cdot Ka)\}$.

That is, the speed command 106 is equal to a signal obtained by passing a signal obtained by applying s/K on the pressure command (differentiated and divided by the elastic constant K) through a low pass filter having a cutoff frequency of Ka·K. In order to cause the speed of the motor 1 to follow the speed command 106, it is necessary for the speed control to pass a frequency component of at least Ka·K. In other words, the speed control bandwidth needs to be equal to or broader than Ka·K. If the speed control bandwidth is narrower than K·Ka, the phase lag occurs, which causes an overshoot to occur on the pressure response or to exhibit an oscillating pressure response.

Substituting Ka of the Equation (8) to Ka leads to:

$$Ka \cdot K = \alpha \times \omega sc \leq \omega sc \qquad (13)$$

That is, the pressure-control control-parameter setting unit 15 calculates the proportional gain Ka of the pressure controller 13 such that a product of the proportional gain Ka of the pressure controller 13 and the elastic constant K identified by the elastic constant identifier 16 is smaller than the speed control bandwidth ωsc of the speed controller 12. By setting the calculated proportional gain Ka to the pressure controller 13, the speed command 106 only includes a frequency component lower than the speed control bandwidth ωsc, and therefore the speed of the motor 1 can follow the speed command 106 with a sufficient accuracy. This makes it possible to achieve a stable pressure control without causing any overshoot or oscillation to occur on the pressure.

As described above, according to the first embodiment of the present invention, because it is configured to include the pressure controller that calculates the internal speed command 107 by performing a transfer characteristic computation at least including a computation element that applies the proportional gain Ka on a deviation between the pressure command and the pressure detection value 103, the speed controller 12 that calculates the current command 105 such that the speed of the motor 1 follows the internal speed command 107 calculated by the pressure controller 13, the filling/pressure-keeping determining unit 17 that determines whether the injection molding machine is performing the pressure keeping operation, the elastic constant identifier 16 that acquires, when the filling/pressure-keeping determining unit 17 determines that the pressure keeping operation is in progress, the pressure detection value 103 and the position detection value 101 as operation information of the motor 1 and identifies the elastic constant K based on the acquired pressure detection value 103 and the position detection value 101, and the pressure-control control-parameter setting unit 15 that calculates the proportional gain Ka of the pressure controller 13 such that a product of the proportional gain Ka of the pressure controller 13 and the elastic constant K is smaller than the speed control bandwidth ωsc of the speed controller 12 and sets the calculated proportional gain Ka to the pressure controller 13, the proportional gain of the pressure control is obtained based on the elastic constant at the time of performing the pressure keeping operation and the speed control bandwidth ωsc of the speed control loop included in the pressure control loop, and therefore it is possible to cause the speed of the motor 1 to follow the speed command 106 with a sufficient accuracy at the time of performing the pressure keeping operation. That is, it is possible to obtain a control device and a control method for an injection molding machine that can execute a stable pressure control.

Second Embodiment

In the first embodiment, the pressure and the position are recorded at Step ST4, and the elastic constant K is identified from a proportional relation between the position of the motor 1 and the pressure, which is established during performing of the pressure keeping operation; however, instead of the position of the motor 1, motor information other than the position, such as speed of the motor 1 or acceleration of the motor 1, can be used.

Figure 5:
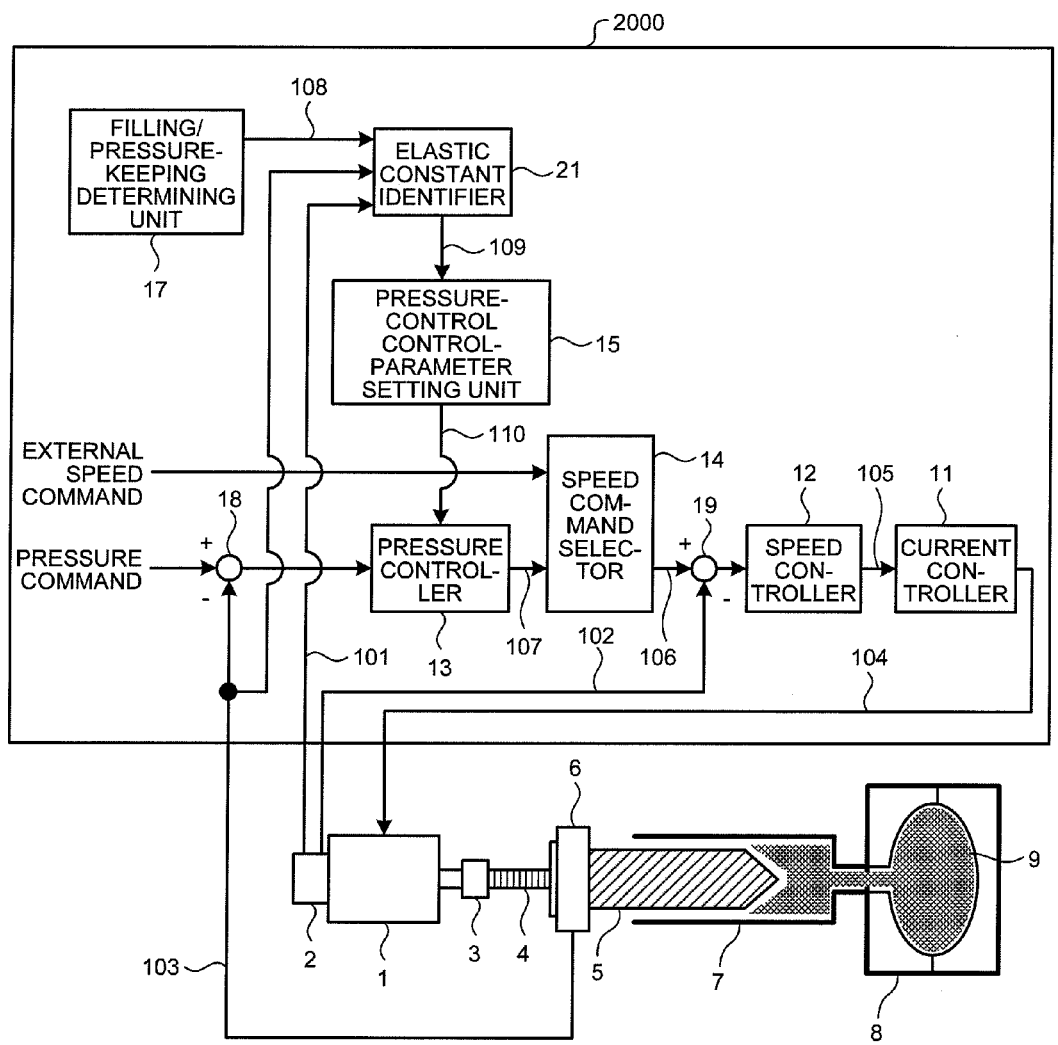
FIG. 5 depicts a configuration of an injection molding machine including a control device according to a second embodiment of the present invention.

A control device according to a second embodiment employs the speed of the motor 1 instead of the position of the motor 1. The control device according to the second embodiment includes the same constituent elements as those in the first embodiment except for the elastic constant identifier. In the second embodiment, as shown in FIG. 5, reference sign 2000 is designated to the control device according to the second embodiment, and reference sign 21 is designated to the elastic constant identifier according to the second embodiment, by which differentiating the second embodiment from the first embodiment.

Figure 6:
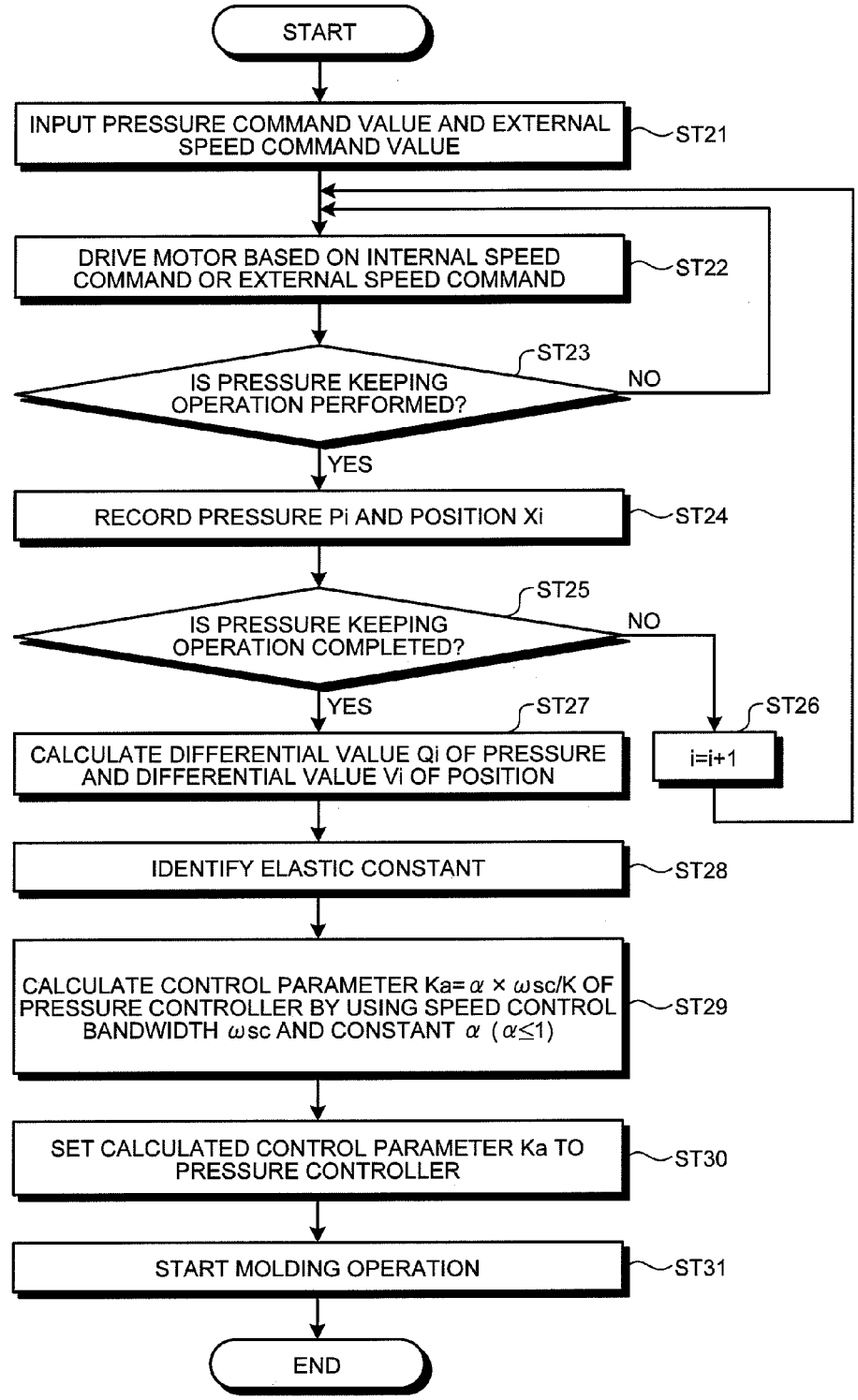
FIG. 6 is a flowchart for explaining a control method for the injection molding machine according to the second embodiment.

FIG. 6 is a flowchart for explaining a control method for the injection molding machine according to the second embodiment. As shown in FIG. 6, the same processes as Step ST1 to Step ST6 explained in the first embodiment are respectively performed at Step ST21 to Step ST26.

At Step ST25, the filling/pressure-keeping determining unit 17 determines whether the pressure keeping operation is completed. When the pressure keeping operation is completed (YES at Step ST25), the elastic constant identifier 21 calculates a differential value Qi of the pressure and a differential value Vi of the position by using the recorded pressure Pi and the position Xi, respectively (Step ST27). Because the index i is incremented for each sampling time, the index i substantially corresponds to an elapsed time from i=0. Therefore, the elastic constant identifier 21 can calculate Qi by using, for example, Pi, Pi-1, Pi-2, and the like. The same is true for Vi. At this time, the elastic constant identifier 21 can be configured to perform an approximate differentiation, instead of merely performing a simple differentiation of dividing differences of the recorded pressure Pi and the position Xi by an interval of the sampling time. Furthermore, the same filtering process can be performed on each of the pressure Pi and the position Xi before the differentiating process.

After the process of Step ST27, the elastic constant identifier 21 identifies the elastic constant K by using a proportional relation established between the speed of the motor 1 and the differential value of the pressure (Step ST28). Specifically, for example, the elastic constant identifier 21 defines Q and V as:

$$Q=(Q1,Q2,\ldots,QN) \tag{14}$$

$$V=(V1,V2,\ldots,VN) \tag{15},$$

and substitutes the Equations (14) and (15) to a relational expression:

$$Q=K\cdot V \tag{16}$$

to identify K by using the least squares method.

At Step ST29 to Step ST31, the same processes as Step ST8 to Step ST10 are performed, respectively.

In this manner, by using the differential value of the pressure instead of the pressure and using the speed instead of the position, it is possible to identify the elastic constant.

By differentiating both sides of the Equation (1) that is established during performing of the pressure keeping operation, $$q=K\cdot v \tag{17}$$

is established between a differential signal q of the pressure and a speed v that is a differential signal of the position. Furthermore, even when the same filtering process is applied to both sides of the Equation (17), $$qf=K\cdot vf \tag{18}$$

is established between signals of and of that are obtained by applying the same filtering process on the differential signal q of the pressure and the speed v.

Even when the both sides of the Equation (1) established during performing of the pressure keeping operation is subject to n-th order differentiation or the both sides are subject to a filtering process after the n-th order differentiation, the proportional relation with the elastic constant K as the proportional constant is maintained, and therefore an n-th order differential value of the position and an n-th order differential value of the pressure (where n is an integer satisfying n≥1) or data obtained by applying the same filter on the n-th order differential value of the position and the n-th order differential value of the pressure can be used instead of the speed that is the first order differentiation of the position and the pressure differential value that is the first order differentiation of the pressure, or the data obtained by applying the same filter on the speed and the pressure differential value. Although any type of filter can be used in this case, it is preferable to use, for example, a low pass filter that eliminates a noise accompanied by the differential operation. Furthermore, the order of performing the differential operation and the filtering process can be different from the above order.

As described above, the elastic constant identifier 21 can also identify the elastic constant K by performing the n-th order differentiation (n≥1) on the position detection value 101 of the motor and the pressure detection value 103 acquired over a plurality of times and fitting a plurality of n-th order-differentiated position detection values 101 and the pressure detection values 103 to a proportional relation.

Furthermore, the elastic constant identifier 21 can also identify the elastic constant K by performing the n-th order differentiation (n≥1) and a predetermined filtering process on the position detection value 101 of the motor and the pressure detection value 103 acquired over a plurality of times and fitting a plurality of n-th order-differentiated and filtering-processed position detection values 101 and the pressure detection values 103 to a proportional relation.

Third Embodiment

In the first and second embodiments, it is configured that a single continuous period from when a pressure-keeping determining unit determines that the pressure keeping operation is in progress until when the pressure-keeping determining unit determines that the pressure keeping operation is not in progress is taken as a test operation, the control parameter is obtained based on data of the position and the pressure obtained when the test operation is performed, and the control parameter is set to the pressure controller once the pressure keeping operation is completed (that is, the above continuous period is over). On the other hand, in a control method according to a third embodiment, the elastic constant K is identified in a sequential manner within a continuous period for which the filling/pressure-keeping determining unit 17 determines that the pressure keeping operation is in progress, and the control parameter of the pressure control is momentarily updated based on the information.

Figure 7:
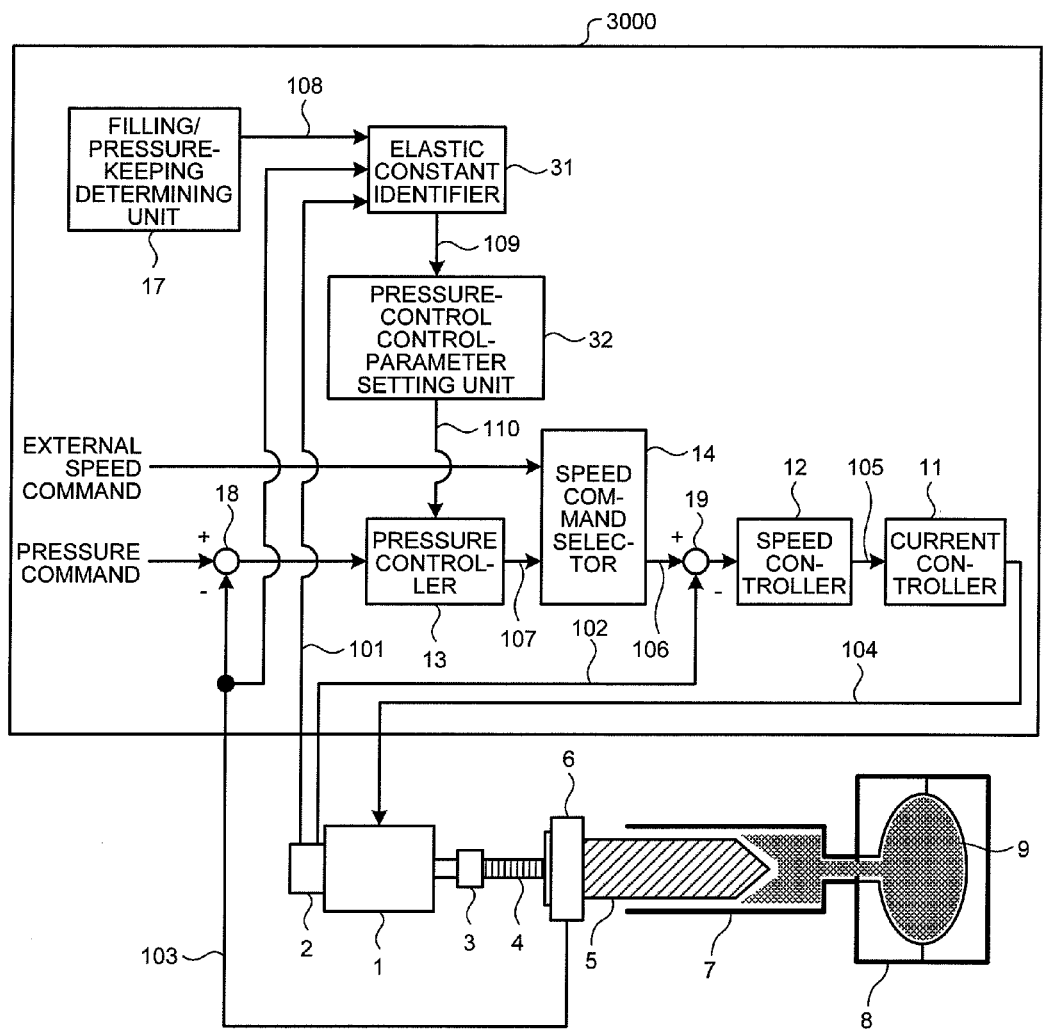
FIG. 7 depicts a configuration of an injection molding machine including a control device according to a third embodiment of the present invention.

A configuration of a control device according to the third embodiment is same as that of the first embodiment except for the elastic constant identifier and the pressure-control control-parameter setting unit. As shown in FIG. 7, reference sign 3000 is designated to the control device according to the third embodiment, reference sign 31 is designated to the elastic constant identifier according to the third embodiment, and reference sign 32 is designated to the pressure-control control-parameter setting unit according to the third embodiment, by which differentiating the third embodiment from the first embodiment.

FIG. 8 is a flowchart for explaining a control method for the injection molding machine according to the third embodiment.

First, the control device 3000 receives inputs of a pressure command and an external speed command (Step ST41). It is assumed here that the values of the input pressure command and the external speed command are not zero.

The speed command selector 14 compares the internal speed command 107 calculated by the pressure controller 13 based on the pressure command with the input external speed command, selects a command having a smaller absolute value as the speed command 106, and the control device 3000 drives the motor based on the selected speed command 106 (Step ST42). The pressure-control control-parameter setting unit 32 sets a proportional gain having a value small enough to prevent an oscillation of the pressure or the speed in advance as an initial value of the pressure controller 13.

Subsequently, the filling/pressure-keeping determining unit 17 determines whether the pressure keeping operation is in progress (Step ST43). A specific method for implementing the determination at Step ST43 can be the same as that at Step ST3 of the first embodiment. When the pressure keeping operation is not in progress (NO at Step ST43), the control device 3000 performs the process of Step ST42.

When the pressure keeping operation is in progress (YES at Step ST43), the filling/pressure-keeping determining unit 17 outputs the signal 108 indicating that the pressure keeping operation is in progress, and the elastic constant identifier 31 that received the notification loads a value of the pressure detection value 103 and a value of the position detection value 101 at the same timing and respectively records the loaded value of the pressure detection value 103 and the loaded value of the position detection value 101 (Step ST44). The values recorded at the process of Step ST44 are represented by the pressure Pi (i=1, 2, ..., N) and the position Xi (i=1, 2, ..., N), respectively. Processes from Step ST44 to Step ST50 (described later) constitute a loop process. The loop process is performed for every predetermined sampling time, and the index i is incremented by the process of Step ST50 (described later) every time Step ST44 is performed. Because the index i is incremented for each sampling time, the index i substantially corresponds to an elapsed time from i=0. In the following explanations, the index i may be represented as a sampling time i.

Thereafter, the elastic constant identifier 31 calculates a differential value Qi of the pressure and a differential value Vi of the position by using the recorded latest pressure Pi and latest position Xi, respectively (Step ST45). In a similar manner as the second embodiment, the elastic constant identifier 31 can be configured to perform an approximate differentiation or to perform a differentiating process after performing a filtering process.

Subsequently, the elastic constant identifier 31 calculates an elastic constant Ki based on the differential value Qi of the pressure and the differential value Vi of the position (Step ST46). Because the process of Step ST46 is performed every time a loop process from Step ST44 to Step ST50 is performed, the elastic constant Ki is updated every time the loop process is performed.

The elastic constant identifier 31 can obtain the elastic constant Ki by fitting the differential value Qi of the pressure and the differential value Vi of the position obtained from the latest pressure Pi and the latest position Xi to a proportional relation by using, for example, a sequential least squares method. Specifically, it is possible to update an intermediate variable Ri in the elastic constant Ki and the sampling time i as described below.

$$K_i = K_{i-1} + R_i V_i (Q_i - K_{i-1} V_i) \tag{19}$$

$$R_i = R_{i-1} - \frac{R_{i-1}^2 \cdot V_i^2}{1 + R_{i-1} \cdot V_i^2} \tag{20}$$

In the Equations (19) and (20), Ki-1 is an identified value of the elastic constant at a sampling time i-1 and Ri-1 is an intermediate variable at the sampling time i-1. An initial value K0 of Ki is set to 0, and an initial value R0 of Ri is set to an appropriately larger value.

The elastic constant identifier 31 inputs the identified elastic constant Ki to the pressure-control control-parameter setting unit 32 as the signal 109.

Thereafter, the pressure-control control-parameter setting unit 32 calculates the proportional gain Ka of the pressure controller 13 by using the elastic constant Ki at the sampling time i, the speed control bandwidth ωsc, and a constant α (α≤1) (Step ST47), and sets the calculated proportional gain Ka to the pressure controller 13 (Step ST48). The proportional gin Ka can be obtained from the following equation:

$$Ka = \alpha \times \omega sc / Ki \tag{21}$$

The Equation (21) is the same as the Equation (8) used in the first embodiment with K replaced by Ki.

Subsequently, the filling/pressure-keeping determining unit 17 determines whether the pressure keeping operation is in progress (Step ST49). A specific method for implementing the determination at Step ST49 can be the same as that at Step ST5 of the first embodiment.

When the pressure keeping operation is not completed (NO at Step ST49), the elastic constant identifier 31 increments the index i (Step ST50). The elastic constant identifier 31 then performs the process of Step ST44 again. When the pressure keeping operation is completed (YES at Step ST49), the operation of the control method for the injection molding machine according to the third embodiment is terminated. In the later molding operation, the pressure controller 13 can be configured to use the proportional gain set in i=N-th loop process or to perform from the process of Step ST41.

Although the elastic constant established between the pressure and the position is identified by using the speed that is the first order differentiation of the position and the pressure differential value that is the first order differentiation of the pressure in the above explanation, in the similar manner as the first embodiment, the elastic constant can be identified by using the position and the pressure. Furthermore, in the same manner as the second embodiment, the elastic constant can be identified by using the n-th order differential value of the position and the n-th order differential value of the pressure or data obtained by applying the same filter on the n-th order differential value of the position and the n-th order differential value of the pressure.

As described above, according to the third embodiment of the present invention, it is configured that the elastic constant identifier 31 acquires, in a continuous period for which the filling/pressure-keeping determining unit 17 determines that the pressure keeping operation is in progress, the position detection value 101 of the motor 1 and the pressure detection value 103 for each sampling time and identifies the elastic constant Ki in a sequential manner by using the latest acquired position detection value 101 and the pressure detection value 103 every time it acquires the position detection value 101 and the pressure detection value 103, and the pressure-control control-parameter setting unit 32 calculates the proportional gain Ka in a sequential manner by using the elastic constant Ki sequentially identified by the elastic constant identifier 31, and sets the calculated proportional gain Ka to the pressure controller 13 in an overwriting manner. Therefore, it is possible to set the proportional gain Ka of the pressure control without performing any test operation.

REFERENCE SIGNS LIST

1 MOTOR
2 ENCODER
3 COUPLING
4 BALL SCREW
5 SCREW
6 LOAD CELL
7 BARREL
8 MOLD
9 RESIN
11 CURRENT CONTROLLER
12 SPEED CONTROLLER
13 PRESSURE CONTROLLER
14 SPEED COMMAND SELECTOR
15, 32 PRESSURE-CONTROL CONTROL-PARAMETER SETTING UNIT
16, 21, 31 ELASTIC CONSTANT IDENTIFIER
17 FILLING/PRESSURE-KEEPING DETERMINING UNIT
18, 19 SUBTRACTOR
101 POSITION DETECTION VALUE
102 SPEED DETECTION VALUE
103 PRESSURE DETECTION VALUE
104 CURRENT
105 CURRENT COMMAND
106 SPEED COMMAND
107 INTERNAL SPEED COMMAND
108, 109, 110, 201 SIGNAL
202, 203, 204, 205 ELEMENT
1000, 2000, 3000 CONTROL DEVICE

The invention claimed is:

1. A control device for an injection molding machine that injects a melted resin filled in a barrel into a cavity of a mold by driving a motor to move forward a screw in the barrel, wherein the control device, which is provided in the injection molding machine, generates a current command for driving the motor based on operation information of the motor and a pressure detection value of the melted resin, the control device comprising:
    a pressure controller that calculates a speed command by performing a transfer characteristic computation including a computation element that applies at least a proportional gain on a deviation between a predetermined pressure command and the pressure detection value;
    a speed controller that calculates the current command such that a speed of the motor follows a speed command calculated by the pressure controller;
    a pressure-keeping-operation determining unit that determines whether the injection molding machine is performing a pressure keeping operation;
    an elastic constant identifier that acquires, when the pressure-keeping-operation determining unit determines that the pressure keeping operation is in progress, the pressure detection value and the operation information of the motor and identifies an elastic constant that is a proportion of a change of the pressure detection value with respect to a displacement of a position of the motor based on the acquired pressure detection value and the operation information of the motor; and
    a control-parameter setting unit that calculates the proportional gain of the pressure controller such that a product of the proportional gain of the pressure controller and the elastic constant identified by the elastic constant identifier is smaller than a speed control bandwidth of the speed controller, and sets the calculated proportional gain to the pressure controller.

2. The control device for an injection molding machine according to claim 1, wherein
    the operation information of the motor is a position detection value of the motor, and
    the elastic constant identifier performs acquisition of a position detection value of the motor and the pressure detection value at a same timing over a plurality of times and identifies the elastic constant by using the position detection value of the motor and the pressure detection value acquired over the plurality of times.

3. The control device for an injection molding machine according to claim 2, wherein
    the elastic constant identifier acquires a position detection value of the motor and the pressure detection value over a plurality of times in a continuous period for which the pressure-keeping-operation determining unit determines that a pressure keeping operation is in progress and identifies the elastic constant by using the position detection value and the pressure detection value acquired over the plurality of times in the continuous period after the continuous period ends, and
    the control-parameter setting unit sets a proportional gain calculated based on the elastic constant to the pressure controller after an elapse of the period.

4. The control device for an injection molding machine according to claim 2, wherein
    the elastic constant identifier acquires a position detection value of the motor and the pressure detection value at a predetermined time interval in a continuous period for which the pressure-keeping-operation determining unit determines that a pressure keeping operation is in progress and identifies the elastic constant in a sequential manner every time the position detection value and the pressure detection value are acquired, and
    the control-parameter setting unit calculates a proportional gain in a sequential manner by using the elastic constant sequentially identified by the elastic constant identifier and sequentially sets the calculated proportional gain to the pressure controller in an overwriting manner.

5. The control device for an injection molding machine according to claim 2, wherein the elastic constant identifier identifies the elastic constant by performing an n-th order differentiation (n≥1) on the position detection value of the motor and the pressure detection value acquired over the plurality of times and fitting a plurality of n-th order-differentiated position detection values and pressure detection values to a proportional relation.

6. The control device for an injection molding machine according to claim 2, wherein the elastic constant identifier identifies the elastic constant by performing an n-th order differentiation (n≥1) and a predetermined filtering process on the position detection value of the motor and the pressure detection value acquired over the plurality of times and fitting a plurality of n-th order-differentiated and filtering-processed position detection values and pressure detection values to a proportional relation.

7. The control device for an injection molding machine according to claim 2, wherein the elastic constant identifier identifies the elastic constant by performing an n-th order differentiation (n≥1) on the acquired latest position detection value of the motor and the latest pressure detection value and fitting the n-th order-differentiated position detection value and pressure detection values to a proportional relation by using a sequential least squares method.

8. The control device for an injection molding machine according to claim 2, wherein the elastic constant identifier identifies the elastic constant by performing an n-th order differentiation (n≥1) and a predetermined filtering process on the acquired latest position detection value of the motor and the latest pressure detection value and fitting the n-th order-differentiated and filtering-processed position detection value and pressure detection values to a proportional relation by using a sequential least squares method.

9. The control device for an injection molding machine according to claim 1, wherein the pressure-keeping-operation determining unit determines whether or not the injection molding machine is performing a pressure keeping operation based on whether the position of the motor has reached a predetermined position.

10. The control device for an injection molding machine according to claim 1, wherein the pressure-keeping-operation determining unit determines whether or not the injection molding machine is performing a pressure keeping operation based on whether the pressure detection value has reached a predetermined pressure.

11. The control device for an injection molding machine according to claim 1, wherein
the speed controller executes a transfer characteristic computation including a computation element that applies at least a proportional gain on a deviation between a speed of the motor and a speed command calculated by the pressure controller, and
the speed control bandwidth is a value obtained by dividing the proportional gain of the speed controller by a total value of an inertia of the motor and an inertia of a machine that operates with a movement of the motor.

* * * * *